Patented Jan. 7, 1936

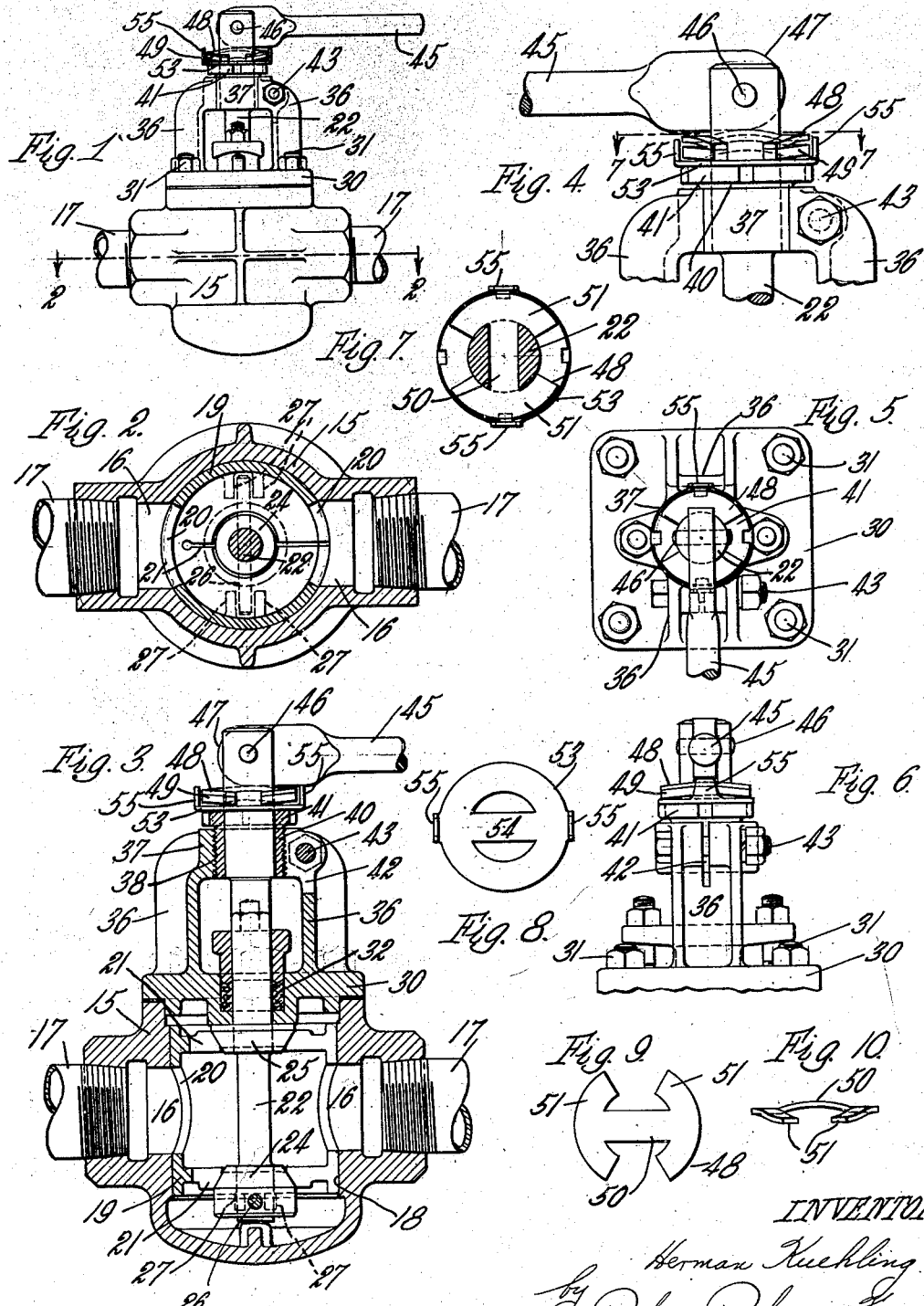

2,027,108

UNITED STATES PATENT OFFICE 2,027,108

COCK OR VALVE

Herman Kuehling, Snyder, N. Y.

Application January 14, 1935, Serial No. 1,704

15 Claims. (Cl. 251—96)

This invention relates to improvements in cocks or valves, and particularly to cocks or valves of the kind in which the plug or movable member is split or otherwise constructed to be expanded and contracted with relation to its seat.

The objects of this invention are to provide a cock or valve of this kind of improved construction, and in which both the turning of the plug and the expansion and contraction of the same is effected through the medium of the stem of the plug; also to provide a construction of this kind in which the stem is movable in an endwise direction to effect the expanding and contracting of the plug and in a direction of rotation to effect the desired turning of the plug, and in which the endwise movement may be carried on independently of the rotary movement; also to provide a cock or valve of this kind with means of improved construction for independently effecting the endwise and rotary movements of the stem; also to provide adjusting means for controlling the extent to which the plug is expanded and pressed against its seat; also to provide a construction by means of which the expansion of the plug is effected through a spring or other resilient means; also to improve the construction of valves or cocks in other respects hereinafter specified.

In the accompanying drawing:

Fig. 1 is a side elevation of a valve or cock embodying this invention.

Fig. 2 is a longitudinal sectional view thereof on an enlarged scale, on line 2—2, Fig. 1.

Fig. 3 is a central vertical sectional view thereof.

Fig. 4 is a fragmentary side elevation thereof on a still larger scale showing the upper portion of the improved valve or cock.

Fig. 5 is a top plan view of the upper portion thereof.

Fig. 6 is a fragmentary end elevation thereof showing the upper portion of the valve or cock.

Fig. 7 is a sectional plan view thereof on line 7—7, Fig. 4.

Fig. 8 is a top plan view of an indicator plate.

Fig. 9 is a plan view of a spring member.

Fig. 10 is an elevation thereof.

My invention is illustrated in the accompanying drawing as applied to a valve or cock of comparatively simple construction and for purposes of illustration, a two-way cock is shown. It will be understood, however, that my invention is equally applicable to valves or cocks having two or more conduits through which fluid may flow, and it will, of course, be understood that the invention may also be applied to jacketed cocks or valves.

15 represents the body or housing of the cock which is provided with a conduit 16 extending lengthwise through the same. The body of the cock may be provided with any suitable connections for pipes or tubes 17. 18 represents a seat formed within the valve or cock and within which a split or expansible plug 19 is arranged. The seat is preferably of cylindrical form since a seat of this form is easy to machine accurately, but it will be understood that a conical seat, or a seat of any other form may be provided, if desired. The upper end of the seat terminates adjacent to an opening in the body 15 through which the plug may be inserted and this opening may be closed by a cover or plate which will be hereinafter described.

The plug 19 as shown is hollow and is provided with openings 20 in the opposite side walls of the plug, which are adapted to be moved into and out of registration with the conduit 16 of the body, and the plug is also provided with one or more slits, the construction shown having a single slit 21 extending lengthwise of the plug from end to end thereof, the slit shown in the drawing terminating at its inner end adjacent to a side wall of the plug and extending at its outer end through the opposite side wall of the plug. A slit of any other form than the one shown may be provided, and preferably the plug is so constructed that when no expanding force is applied to the same, it will fit loosely within the seat, and when expanded, it will be pressed tightly against the seat, and the outer curved surface of the plug will be of a form or curvature corresponding with that of the seat.

The expansion of the plug to move the same into tightly fitting relation to the seat may be accomplished in any suitable or desired manner, preferably by means of wedge-shaped members which can be actuated by lengthwise movement of the stem 22 of the cock. In the construction shown for this purpose, the opposite ends of the plug are provided with tapering or wedge-shaped surfaces or recesses approximately concentric with the outside surface of the plug, and a wedge-shaped frusto-conical member 24 is provided to engage with the corresponding tapered seat at the lower end of the plug and a second wedge-shaped member 25 is provided to engage the upper wedge-shaped seat of the plug. One of these wedge-shaped members is secured to the stem 22 and the other member is arranged to permit the stem to move lengthwise thereof, and in the particular construction shown, the lower wedge-shaped member 24 is fixed securely to the lower part of the stem 22, for example, by means of a pin or rod 26 extending through a portion of the wedge member 24 and the stem 22, and the ends of the pin 26 preferably extend beyond the wedge member 24. The other wedge member 25 is provided with a central aperture through which the stem 22 extends and in which the stem is movable lengthwise relatively to the wedge member.

The stem 22 is also connected with the plug 19 in such a manner that rotary motion of the stem is imparted to the plug while movement of the stem in the direction of its length may be effected without corresponding movement of the plug. Any suitable means may be employed for this purpose, and in the construction shown, the ends of the pin or rod 26 are employed for this purpose and cooperate with downwardly extending lugs 27 formed on the lower end of the plug 19 and engaging opposite sides of the ends of the pin 26. These lugs, as shown clearly in Fig. 2, form between them vertical slots or spaces in which the ends of the pin 26 may move during the lengthwise movement of the stem.

The upper wedge member 25 may be held in any suitable manner against movement relative to the body of the plug in the direction of the length of the stem. In the particular construction shown, the upper flat face of the wedge member 25 bears against the corresponding flat face of a part of the body or housing, for example, a removable cover or closure member 30 for the upper end of the body or housing 15, and this cover may be secured to the body in any suitable manner, for example, by means of bolts 31. The cover is preferably also provided with the usual stuffing box 32 arranged about the stem 22. The mechanism for imparting both longitudinal and rotary motion to the stem may be of any suitable or desired construction, and in the construction shown, this mechanism is also mounted upon the cover member 30 of the cock. For this purpose, the cover member is provided with an upwardly extending yoke or bridge including a pair of upwardly extending legs 36 arranged at opposite sides of the stuffing box and terminating in an upper transversely extending connecting portion 37 which has an aperture 38 through which the stem 22 extends, and against which force may be exerted to move the stem 22 in the direction of its length for expanding the plug 19. Any suitable means for exerting such pressure may be provided, and preferably an adjustable abutment is provided against which such force may be exerted. This abutment may be of any suitable form, and in the construction illustrated, an adjustable externally threaded sleeve 40 is provided for this purpose, which is adjustably secured in a threaded aperture in the upper connecting portion 37 of the yoke or bridge. The sleeve 40 is preferably provided at its upper end with a flange 41. The yoke or bridge is preferably provided with a slit 42 in the upper portion thereof, the slit extending from the exterior of the connecting portion 37 into the threaded aperture, and a bolt 43 extends crosswise of the slit so that by tightening this bolt, the yoke 37 may be clamped into locking engagement with the sleeve 40.

The movement of the stem 22 of the plug may be effected by any suitable or desired means. In the construction illustrated, I provide the upper end of the stem with a lever which may be used for turning the stem and which also may be moved relatively to the stem for moving the stem in the direction of its length. The lever 45, in the particular embodiment of the invention illustrated in the drawing, is pivoted at 46 in a central slot formed in the upper end of the stem 22, the pivot extending transversely of the length of the stem 22. The portion 47 of the lever adjacent to the pivot 46 is cam-shaped or eccentric with respect to the pivot and is adapted to exert pressure either directly or indirectly against the sleeve 40. In the construction shown, yielding means are interposed between the eccentric portion of the lever and the sleeve 40, these means including a pair of spring members 48 and 49. Each of these spring members in the construction shown has a central portion 50 extending through the slot in the end of the stem 22 and segmental portions 51 formed integral with the portion, and these spring members may be formed in such a manner that the portion 50 is of arch-shape and curved upwardly from the end thereof, and the segmental portions 51 are also curved in this manner so that their free ends extend into lower positions than the intermediate ends which connect with the central portion 50, as clearly shown in Fig. 10. The eccentric face 47 of the lever bears against the middle of the portion 50 of the upper spring member and in exerting downward pressure on the same tends to flatten out the portion 50 and the downward pressure on this portion also tends to flatten out the segmental portions 51. When two of these spring members are employed, as in the construction illustrated, the upper one may be of thinner material and may have greater curvature than the lower portion, so that the initial pressure of the lever is taken up by the upper spring member 48 until this member is flexed into contact with the lower spring member, whereupon further pressure on the stem by the eccentric 47 will also tend to flatten out the lower spring 49. Preferably the parts of the cock are so adjusted that when the stem is in its lowered position, as shown in Fig. 4, the upper spring member exerts a slight force on the stem in a direction to hold the wedge members in contact with the conical recesses of the plug. It will, of course, be understood that one or any desired number of spring members may be employed, or, if desired, the spring members may be eliminated.

The free ends of the segmental portions 51 of the lower spring member may bear against the upper flange of the sleeve 40, or if desired, an indicator plate 53 and lever support or stop may be interposed between the lower spring 49 and the sleeve 40, this indicator plate or stop also having a central portion 54, see Fig. 8, extending crosswise of the slot in the end of the stem 22 and the indicator plate may be provided with suitable lugs, projections, or pointers 55. When this invention is applied to a two-way cock, as illustrated in the drawing, the lugs 55 of the indicator plate are preferably made to extend in the same direction as the passages or port openings 20 through the plug, and if this invention is applied to a three-way cock, an additional lug or pointer may be added to the indicator plate 53 to indicate the additional opening or port in the plug member. It will be understood, however, that this indicator plate may be entirely dispensed with or may be replaced by other means for indicating the location of the port openings or passages in the plug.

In the use of the cock described, when the lever 45 is in the position indicated in Fig. 4, in which the short radius of the eccentric 47 extends from the pivot 46 to the adjacent spring member 48, the stem 22 will be in its lowest position, thus exerting little or no force through the wedge or expansion members to the plug, so that the plug will be contracted and will fit loosely within its seating surface 18. The lever 45 may then be easily turned in any direction, its turning movement being transmitted to the plug through the pin 26 and lugs 27. When the plug is set into the desired position, which may be fully opened, fully closed, or any intermediate position, the plug may be expanded by merely moving the lever 45 about its pivot 46, and when moved from the position indicated in Fig. 4 to that indicated in Fig. 3, the stem 22 will be moved upwardly to the maximum extent, thus forcing the lower wedge member 24 upwardly and also moving the plug member upwardly against the upper wedge member 25, and thus simultaneously expanding the plug. The force exerted by the eccentric 47 of the lever in the particular construction shown, acts through the medium of the springs, so that a yielding force is exerted to expand the plug. If desired, however, the springs may be omitted and a rigid support provided in place of the springs which will result in a positive movement of the stem to expand the plug. It will also be noted that the construction shown results in no strains on the body except those exerted by the plug itself and all of the strains exerted by the stem on the wedge members act through the cover assembly only.

The construction shown also results in a floating arrangement of the wedge members so that these members can move laterally to a slight extent sufficient to adjust themselves correctly with reference to the plug and its seat. This not only ensures a correct and accurate seating of the plug but also eliminates the need for extremely accurate concentric machining of the wedge members and associated parts, thereby reducing the cost of producing the cocks and also ensuring long life, since wear on the parts of the cock is automatically compensated for by slight movements of the wedge members.

The extent of the force which the stem exerts on the plug through the wedge members when moved may also be regulated by adjusting the sleeve 40, by releasing the clamping bolt 43 and turning the sleeve 40 until the desired expansion of the plug is obtained when moving the handle lever about its pivot 46. The sleeve 40 may then be locked in its adjusted position by tightening the bolt 43. It will, of course, be understood that the angle of the wedge members is such that when no endwise force is exerted on the stem, the wedge members and plug will move into contracting positions.

I claim as my invention:

1. A cock including a body having a conduit extending through the same, a seat extending across said conduit, an expansible plug rotatably arranged in said seat and having a passage therethrough adapted to be moved into registration with said conduit, a pair of frusto-conical wedge members engaging corresponding seats formed in the opposite end portions of said plug, a stem secured to one of said wedge members and also connected with said plug and passing through the other wedge member, a cover closing one end of said body and against which said other wedge member bears, and means exerting pressure against said cover for moving said stem endwise to move said first wedge member toward said other wedge member for expanding said plug in its seat, said stem also being rotatable to move said plug about its axis to move said passage into and out of registration with said conduit, said other wedge member being urged against said seat, whereby all forces for urging said wedge members toward each other are exerted against said cover without transmission to said body.

2. A cock including a body having a conduit therethrough and a valve seat with its axis extending crosswise of said conduit, a split hollow plug in said valve seat and having a passage adapted to register with said conduit, wedge means for expanding said plug, a stem extending into said body and having its inner portion connected with said wedge means and with said plug and movable both endwise and about its axis, and means for actuating said wedge means by endwise movement only of said stem and turning said plug by rotary movement only of said stem, the inner portion of said stem and said wedge means being out of contact with said body when said stem is moved in a direction to expand said plug to permit said wedge means to center itself with reference to said plug seat.

3. A cock including a housing having an expansible plug arranged therein, a stem connected with said plug for turning the same and movable relatively to said plug in the direction of its length independently of its turning movement, said stem extending to the exterior of said housing, means actuated by the lengthwise movement of said stem to expand said plug, a lever connected to said stem for turning the same, and means associated with said lever and said housing for exerting a pull on said stem in a direction to move the same outwardly with reference to said housing to expand said plug.

4. A cock including a housing having an expansible plug arranged therein, a stem connected with said plug for turning the same and movable relatively to said plug in the direction of its length independently of its turning movement, wedge means actuated by the lengthwise movement of said stem in a direction outwardly with respect to said housing to expand said plug, a lever connected with said stem by a pivot extending transversely of said stem, whereby said lever may move said stem about its axis, said lever having a cam surface on the end thereof adjacent to said stem and adapted to exert pressure against said housing when said lever is moved about said pivot and to apply tension to said stem to move the same in the direction of its length.

5. A cock having a housing, an expansible plug arranged to turn in said housing, a stem connected with said plug for turning the same and movable lengthwise relatively to said plug, means cooperating with said stem for expanding said plug when said stem is moved in the direction of its length, a lever connected with said stem on the exterior of said housing for turning said plug and movable relatively to said stem to effect endwise movement of the same, and means mounted on said housing and adjustable toward and from said lever with which said lever cooperates for moving said stem in the direction of its length.

6. A cock having a housing, an expansible plug arranged to turn in said housing, a stem connected with said plug for turning the same and movable lengthwise relatively to said plug, means cooperating with said stem for expanding said plug when said stem is moved in the direction of its length, a lever connected with said stem on the exterior of said housing for turning said plug and movable relatively to said stem to effect endwise movement of the same, and a sleeve through which said stem extends and which is adjustable lengthwise of said stem relatively to said housing and with which said lever cooperates for moving said stem in the direction of its length.

7. A cock having a housing, an expansible plug arranged to turn in said housing, a stem connected with said plug for turning the same and movable lengthwise relatively to said plug, means cooperating with said stem for expanding said plug when said stem is moved in the direction of its length, a lever connected with said stem on the exterior of said housing for turning said plug and movable relatively to said stem to effect endwise movement of the same, means mounted on said housing and adjustable toward and from said lever with which said lever cooperates for moving said stem in the direction of its length, and resilient means interposed between said lever and said sleeve.

8. A cock including a housing having an expansible plug arranged therein, a stem connected with said plug for turning the same and movable relatively to said plug in the direction of its length independently of its turning movement, means actuated by the lengthwise movement of said stem to expand said plug, a lever connected to said stem for turning the same, means on said lever and cooperating with said housing for effecting lengthwise movement of said stem, and a pair of resilient members interposed between said lever and said housing which act successively to increase the yielding force exerted by said lever on said stem.

9. A cock having a housing, an expansible plug arranged to turn in said housing, a stem connected with said plug for turning the same and movable lengthwise relatively to said plug, means cooperating with said stem for expanding said plug when said stem is moved in the direction of its length, a lever connected with said stem on the exterior of said housing for turning said plug and movable relatively to said stem to effect endwise movement of the same, means mounted on said housing and adjustable toward and from said lever with which said lever cooperates for moving said stem in the direction of its length, and means on said stem exterior to said housing and arranged to turn with said stem for indicating the position of said plug with relation to said housing.

10. A cock including a body having a conduit extending through the same, a seat extending across said conduit, an expansible and self-contractible single piece plug rotatably arranged in said seat and having a passage therethrough adapted to be moved into registration with said conduit, a pair of wedges engaging opposite end portions of said plug for expanding said plug and permitting said plug to contract, a stem arranged to exert a pull on one of said wedges and extending loosely through the other wedge and also connected with said plug to turn the same, a cover closing said body and against which said other wedge bears, and means exerting force against said stem and said cover for moving said stem endwise without rotation to actuate said wedges.

11. A cock including a body having a conduit extending through the same, a seat extending across said conduit, an expansible plug rotatably arranged in said seat and having a passage therethrough adapted to be moved into registration with said conduit, a pair of frusto-conical wedge members engaging corresponding seats formed in the opposite end portions of said plug, a cover closing one end of said body and against which one of said wedge members bears, a stem extending through said cover and the wedge member bearing against the same and engaging said other wedge member for drawing the same toward said first wedge member, and means reacting with said cover and a portion of said stem located outside said cover to exert an outward pull on said stem.

12. A cock including a body having a conduit therethrough, and a valve seat with its axis extending crosswise of said conduit, a split hollow plug in said valve seat and having a passage adapted to register with said conduit, said body having an opening through which said plug may be inserted into and removed from said body, a cover closing said opening, a pair of wedges arranged to engage said plug and arranged to expand said plug when one wedge is moved toward the other, one of said wedges having a substantially flat face bearing against the inner surface of said cover and having a longitudinal aperture, a stem extending through said cover and said aperture and connected with the other wedge to draw the same toward said cover, and means exerting pressure against the outer face of said cover and tension on said stem to move said stem outwardly relatively to said housing and to draw said other wedge toward the first mentioned wedge to expand said plug.

13. A cock including a body having a conduit extending through the same, a seat extending across said conduit, an expansible plug rotatably arranged in said seat and having a passage therethrough adapted to be moved into registration with said conduit, a pair of frusto-conical wedge members engaging corresponding seats formed in the opposite end portions of said plug, a cover closing one end of said body and against which one of said wedge members bears, a stem extending through said cover and the wedge member bearing against the same and engaging said other wedge member for drawing the same toward said first wedge member, means reacting with said cover and a portion of said stem located outside said cover to exert an outward pull on said stem, and yielding means inserted between said pull exerting means and said cover, to produce a yielding pull on said stem.

14. A cock including a body having a conduit therethrough and a valve seat with its axis extending crosswise of said conduit, a split hollow plug in said valve seat and having a passage adapted to register with said conduit, a pair of wedges for expanding said plug and arranged near the opposite end portions of said plug, a stem extending into said housing and axially through said plug to transmit rotation of said stem to said plug and having a longitudinal movement relatively to the plug, the inner end of said stem being connected with one of said wedges, the inner end of said stem and the wedge connected therewith being out of contact with any part of said body when moved in a direction to expand said plug, and means for moving said stem endwise without rotation to actuate said wedge means and for rotating said stem to actuate said plug.

15. A cock including a body having a conduit therethrough and a valve seat with its axis extending crosswise of said conduit, a split hollow plug in said valve seat and having a passage adapted to register with said conduit, said body having an aperture through which said plug may be inserted into said body, a cover for closing said aperture, a pair of wedges for expanding said plug, one of said wedges having a substantially flat surface bearing against a corresponding surface of said cover, a stem extending into said housing and through said plug and loosely connected with the other wedge, means for moving said stem endwise in a direction out of said housing to move the wedge connected therewith toward the other wedge, said inner portion of said stem and the wedge connected therewith being out of contact with portions of said housing when said stem is moved lengthwise in a direction out of said housing, whereby both of said wedge members have a floating support with reference to said housing to locate themselves with reference to said plug.

HERMAN KUEHLING.